United States Patent [19]
Dang Vu et al.

[11] Patent Number: 5,186,909
[45] Date of Patent: Feb. 16, 1993

[54] REACTION CHAMBER COMPRISING A CALENDER REACTOR AND MEANS FOR BEDDING THE FLOW OF A HEAT-CARRYING FLUID

[75] Inventors: Quang Dang Vu, Neully; Sigismond Franckowiak, Rueil Malmaison; Alain Grehier, Paris; Philippe Vacher, Vienne; Jean-Pierre Burzynski, Lyons, all of France

[73] Assignee: Institut Francais du Petrole, Rueil-Malmaison, France

[21] Appl. No.: 642,585

[22] Filed: Jan. 17, 1991

[30] Foreign Application Priority Data

Jan. 19, 1990 [FR] France ................................ 90 00664

[51] Int. Cl.⁵ ................................................ B01J 8/02
[52] U.S. Cl. ........................................ 422/213; 44/639; 208/134; 422/196; 422/200; 422/217; 422/218; 422/219
[58] Field of Search ............... 422/196, 200, 212, 213, 422/218, 219; 44/639; 208/134

[56] References Cited

U.S. PATENT DOCUMENTS

| | | | |
|---|---|---|---|
| 1,894,992 | 1/1933 | Hechenbleikner et al. | 422/218 |
| 2,163,599 | 6/1939 | Houdry | 422/218 |
| 2,521,538 | 9/1950 | Rees | 422/218 |
| 2,715,570 | 8/1955 | King | 422/218 |
| 2,835,560 | 5/1958 | Bason et al. | 422/218 |
| 3,535,879 | 10/1970 | Kuntz | 422/218 |
| 4,095,953 | 6/1978 | Gutterman et al. | 422/219 |
| 4,225,562 | 9/1980 | Anderson | 422/219 |
| 4,478,793 | 10/1984 | Vickers | 422/218 |
| 5,073,352 | 12/1991 | Dang Vu et al. | 422/213 |

Primary Examiner—Robert J. Warden
Assistant Examiner—Timothy M. McMahon
Attorney, Agent, or Firm—Millen, White, Zelano and Branigan

[57] ABSTRACT

A reaction chamber (E) comprises a calender reactor (5) comprising a device (4) for introducing a feedstock; a device (6) for carrying off the treated feedstock; at least two elementary reaction cells (52), not contiguous to one another, each one consisting of an individual feedstock distributor, an individual collector of the treated feedstock, and a catalytic bed, the cells being separated from one another by a channel (51); at least one device (V) for circulating a heat-carrying fluid in each channel (51); at least n partitions (S) for separating the flow of the heat-carrying fluid, n being an integer greater than or equal to 1; and at least n+1 means (T) for heating the heat-carrying fluid. The chamber can be used for performing the catalytic reforming of naphtha under low pressure.

15 Claims, 6 Drawing Sheets

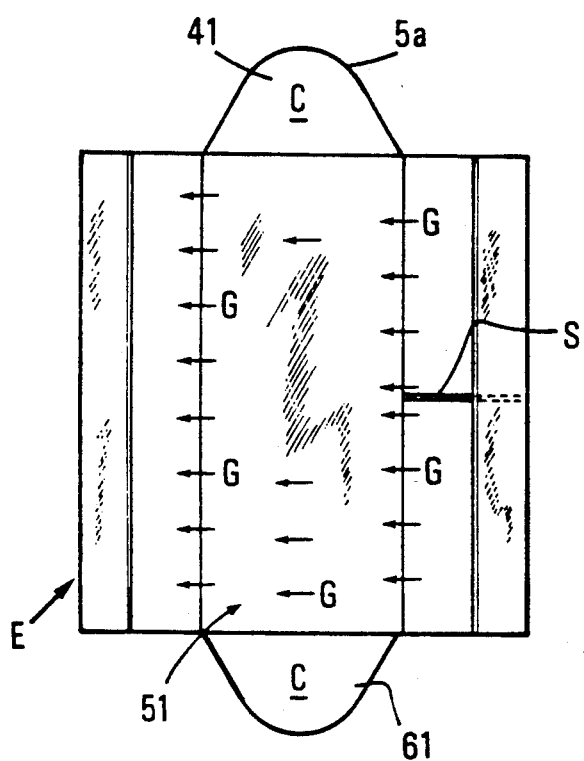
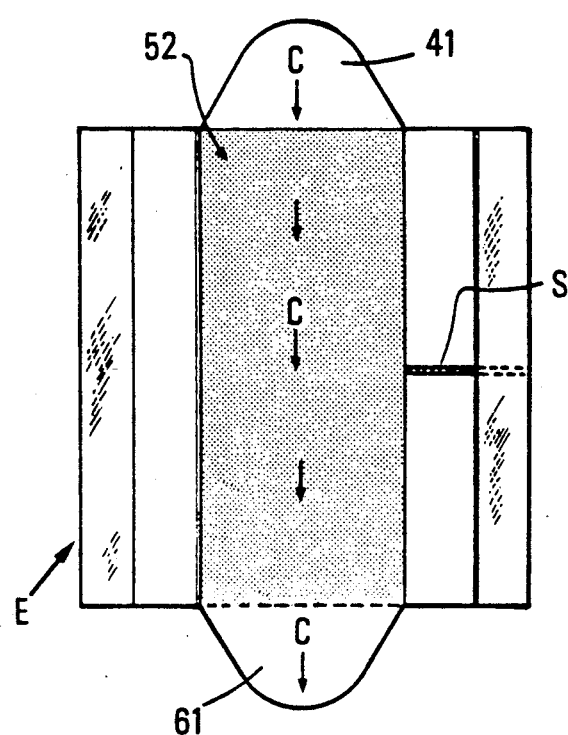

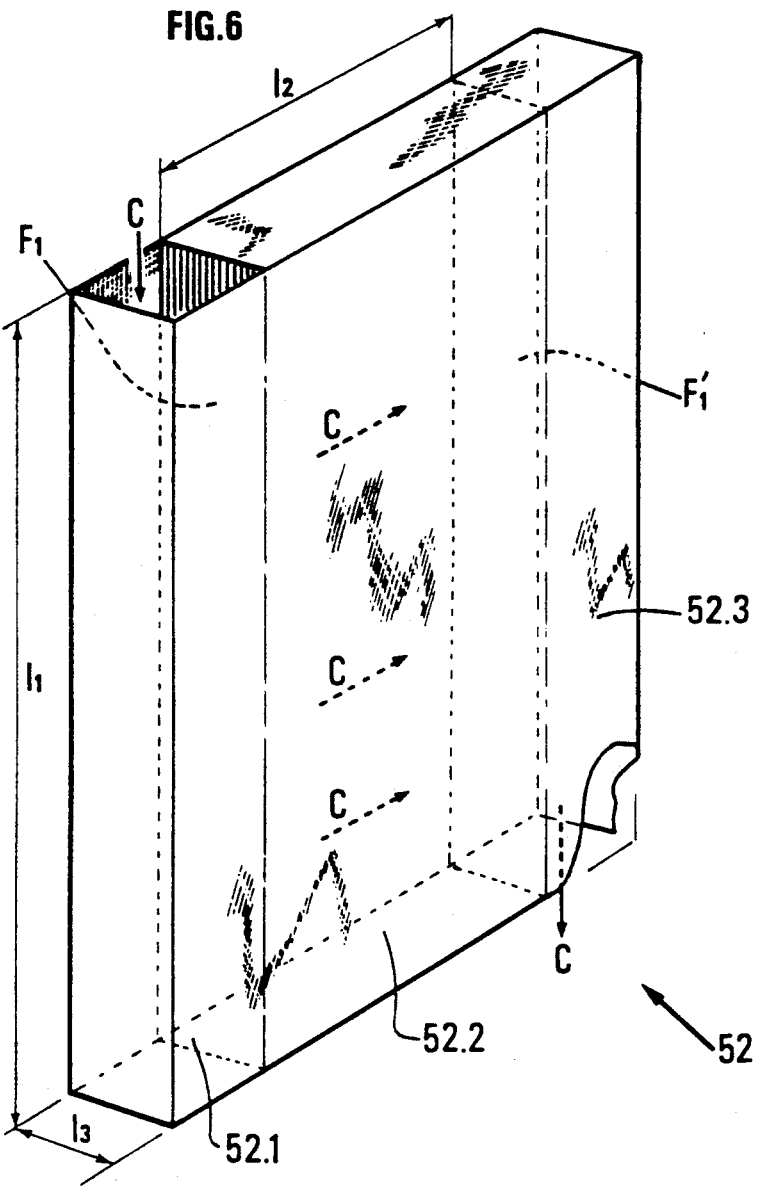
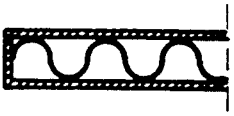
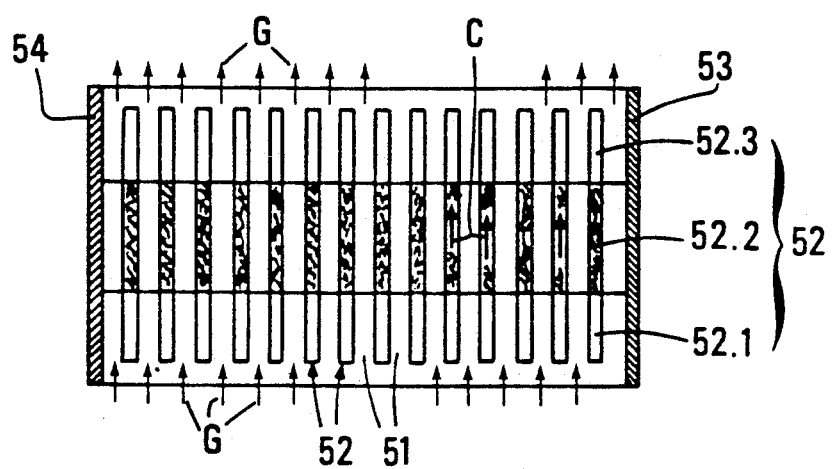

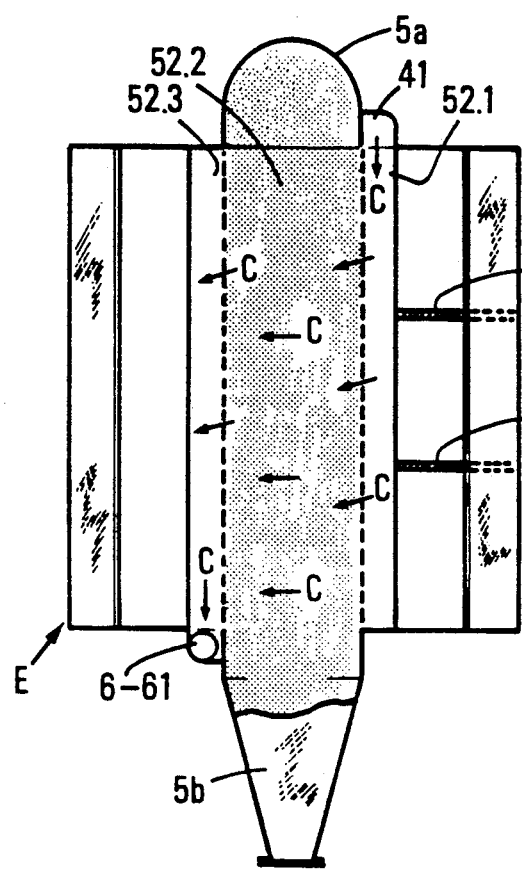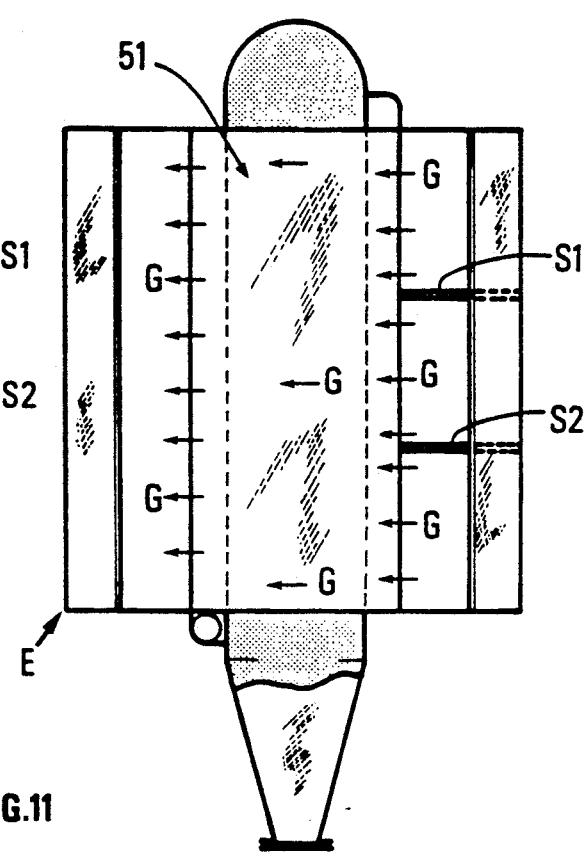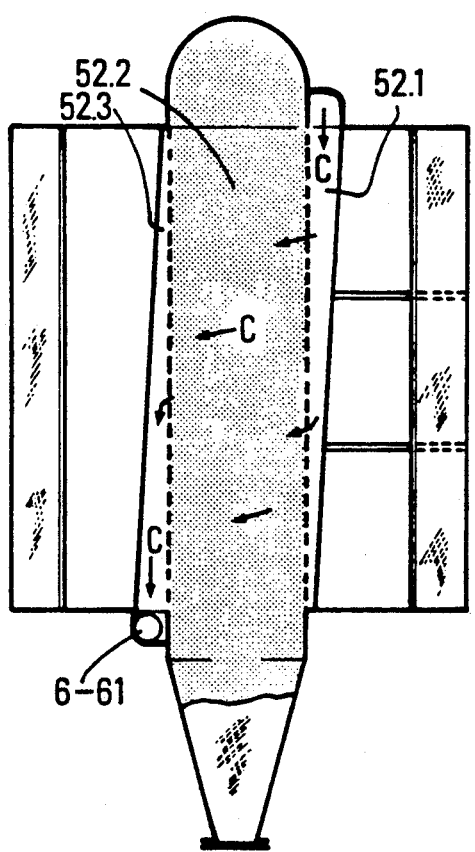

REACTION CHAMBER COMPRISING A CALENDER REACTOR AND MEANS FOR BEDDING THE FLOW OF A HEAT-CARRYING FLUID

BACKGROUND OF THE INVENTION

The present invention relates to a reaction chamber comprising a reactor and means adapted for adjusting the amount of heat necessary for the course of the reactions to be carried out within this reactor to the required value at each level of said reactor according, in the case of catalytic reactions, to the activity of the catalyst at the considered level.

The object of the present invention is also the use of said reaction chamber notably for carrying out the catalytic reforming of hydrocarbon cuts, particularly naphthas, under low pressure, in the presence of at least one catalyst. Its object is also the use of said reaction chamber for carrying out the dehydrogenation of a hydrocarbon paraffinic cut and notably the dehydrogenation of propane into propylene. Its object is also the use of said reaction chamber for carrying out the cyclization or dehydrocyclization of alkanes into aromatic compounds. Lastly, its object is also the overall endothermic processes of catalytic reforming, dehydrogenation and dehydrocyclization that are implemented in said reaction chamber.

More precisely, the present invention relates to a reaction chamber which will be described in relation with the embodiment presented in the attached FIGS. 1 to 11 and given by way of illustrative but non limitative examples.

BRIEF DESCRIPTION OF THE DRAWINGS

FIGS. 3 and 4 correspond to a vertical section of the reaction chamber (E), a section that is achieved in the case of FIG. 3 in the space (or the channel) contained between two neighboring lattice catalytic reaction cells and at the level of a reaction cell in the case of FIG. 4.

FIG. 6 illustrates a preferred variant of one of the main devices contained in reactor (5) :an elementary catalytic reaction cell.

FIG. 7 corresponds to the horizontal section AA of reactor (5) of FIG. 5.

FIG. 8 corresponds to a vertical section of reactor (5) of FIG. 5, a section that is achieved in an elementary catalytic reaction cell.

FIG. 9 represents a vertical section of reactor (5) of FIG. 5, a section achieved in the space (or the channel) contained between two neighboring elementary catalytic reaction cells.

FIGS. 10A, 10B, and 10C show, by way of example profiles of ducts that can be used in the spaces or channels contained between two neighboring elementary catalytic reaction cells.

FIG. 11 corresponds to a vertical section of a reactor (5) of the same type astheone which is presented in FIG. 5, a section that is achieved at the level of an elementary catalytic reaction cell, in the case of a reactor (5) having an individual distributor (52.1) and an individual collector (52.3) whose shape, preferred according to the present invention, is substantially prismatic.

In the FIGS., the letter C and the arrows C represent the feedstock and the course of the feedstock to be treated and of the treated feedstock, and the letter G and the arrows G represent the fluid and the course of the heat-carrying fluid.

DESCRIPTION OF THE INVENTION

Figure 1:
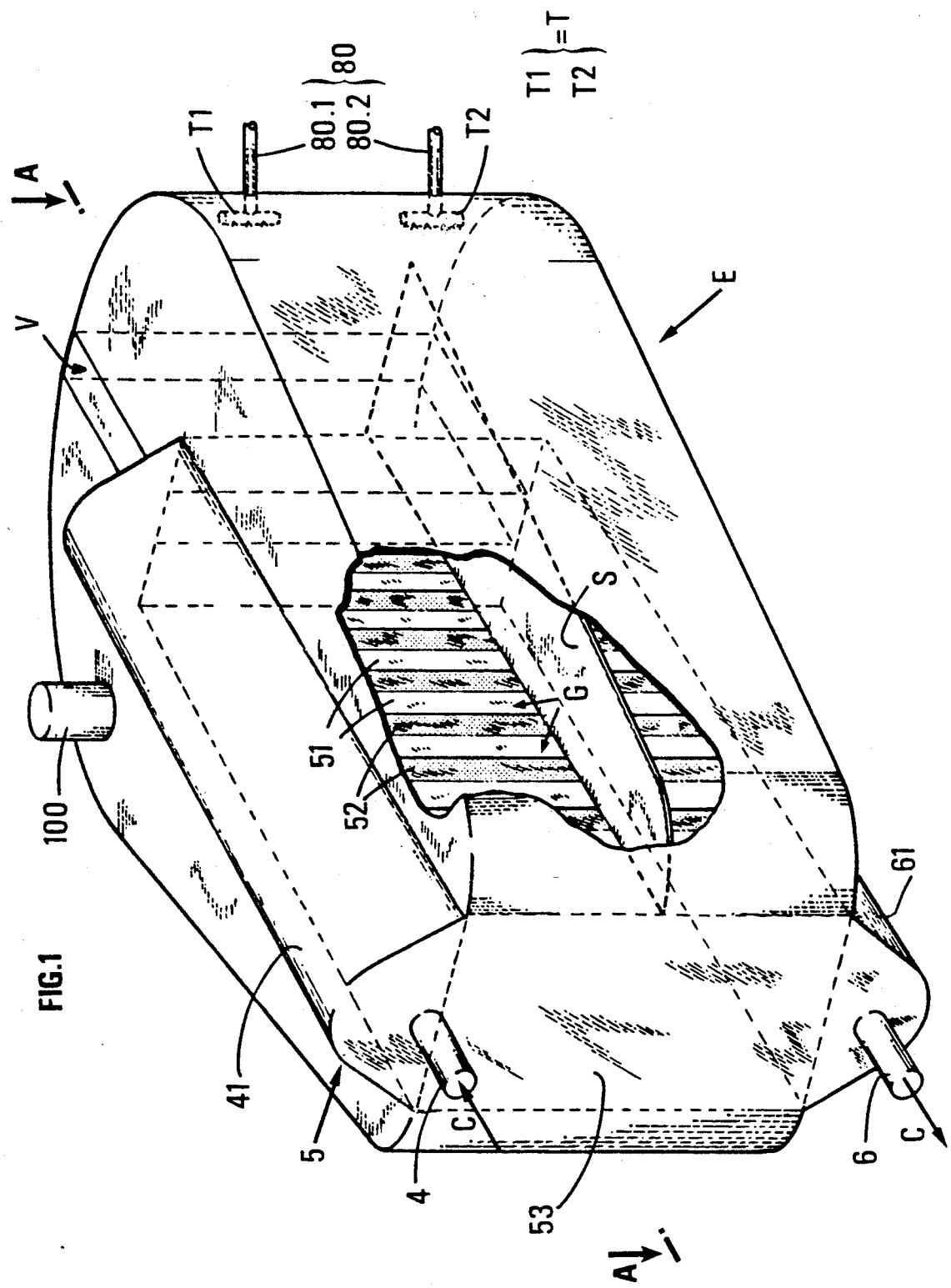
FIG. 1 diagrammatically illustrates a reaction chamber (E) according to the invention.
Figure 2:
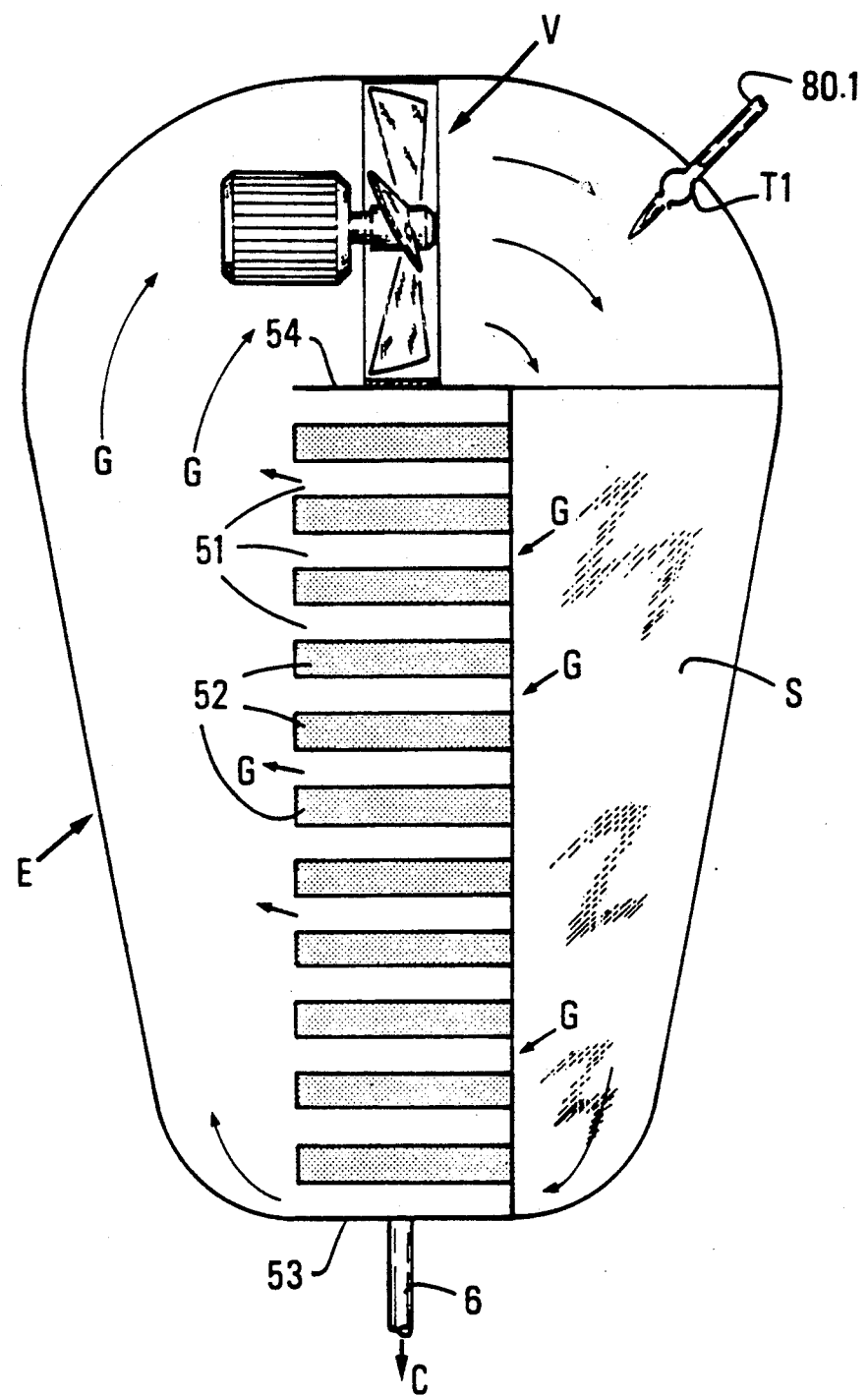
FIG. 2 corresponds to a horizontal section following the axis AA of the reaction chamber (E) schematized in FIG. 1.

The present invention thus relates to a reaction chamber (E) one type of embodiment of which is illustrated in FIGS. 1 and 2, comprising :

- a calender reactor (5) with an extended shape comprising at a first end at least one means (4) for introducing a feedstock (C), liquid or gaseous, to be treated, at a second end at least one means (6) for carrying off the treated feedstock, at least two elementary reaction cells (52), not contiguous to one another and not contiguous to the walls (53, 54) of said reactor (walls usually substantially vertical), each one linked, from one of their ends, to said means (4) for introducing said feedstock, usually through the general feedstock distributor (41), and from their other end to said means (6) for carrying off said treated feedstock, usually through the general collector (61) of the treated feedstock, said reaction cells (52) containing in at least one part of their volume at least one powdery solid and (said cells) being separated from one another, as well as from the walls of the reactor, by a channel or hollow inner space (heat exchanger) (51) which stretches over a length at least equal to that over which said powdery solid contained in said reaction cells stretches,
- at least one means (V) for circulating in each channel (51) of said reactor (5), in a substantially transverse way in relation to the overall direction of flow of the feedstock to be treated in said reactor (5), at least one heat-carrying fluid contained in said reaction chamber, said circulating means being usually a ventilator and said heat-carrying fluid being usually a gas (or a mixture of gases),
- at least n means (S) for stratifying the flow of heat-carrying fluid, said means (S) being positioned in a substantially perpendicular way in relation to the overall direction of circulation of the feedstock to be treated in said reactor and upstream, in relation to the direction of circulation of said heat-carrying fluid, from the face of channels (51) through which said heat-carrying fluid enters said channels, n being an integer greater than or equal to 1, most often greater than or equal to 2,
- at least n+1 thermal means (T) each one modifying the enthalpy of part of said heat-carrying fluid, each one of said means (T) being positioned on either side of a plane defined by one of said stratifying means (S) and upstream, in relation to the direction of circulation of said heat-carrying fluid, from the face of the channels through which said heat-carrying fluid enters said channels; the power supply of these thermal means (T), for example $T_1$ and $T_2$, is usually achieved through at least one duct (80), for example through ducts (80.1) and (80.2) diagrammatically shown in FIG. 1.

These thermal means (T) most often bring calories to the heat-carrying fluid (that is to say heating means) by convection at the time of its flowing through channels (51) while crossing the reactor (5). Various heating means can be utilized, such as for example electric resistances or burners. Burners will be used most often, for example radiant burners (of the Pyrocore type for example) whose radiation tube is preferably located in the circulation plane of the heat-carrying fluid : thereby, in the most frequent case of a reaction chamber (E) comprising a substantially vertical reactor (5), at least one means (V) such as a ventilator with a substantially horizontal axis and at least n substantially horizontal bedding means (S), said radiation tube(s) will be substantially horizontal and located within the flow of heat-carrying gases circulating following a substantially horizontal way. The burners used are usually fed with a gaseous, liquid or solid fuel, preferably gaseous or liquid, through at least one duct (80). The present invention also comprises the possibility of utilizing one or more thermal means for cooling down the heat-carrying fluid.

The reaction chamber (E) according to the present invention comprises a reactor (5) whose reaction cells (52) contain in at least part of their volume at least one powdery solid which is most often a catalytic solid or which contains a portion of a catalytic solid. This solid bed or catalyst bed can be a fixed bed, a moving bed, an ebullated bed or a fluidized bed. The feedstock can cross this solid bed in a vertical, oblique or horizontal way when the chamber (E) and the reactor (5) are substantially vertical.

In the most current type of embodiment of the reaction chamber (E) such as that presented in perspective in FIG. 1, in a horizontal section following the axis AA in FIG. 2, in a vertical section at the level of a channel (51) in FIG. 3 and at the level of a reaction cell (52) in FIG. 4, the reactor (5) has the overall shape of a right-angled parallelepiped, the means (V) for circulating the heatcarrying fluid are located in the extension of the reactor (5) substantially in the volume contained between the planes going through 4 of the faces of said parallelepiped and the stratifying means (S) as well as the thermal means (T), each one modifying the enthalpy of part of said heat-carrying fluid, are located in a volume contained between said circulating means (V) and the face of the right-angled parallelepiped through which the heat-carrying fluid enters. As an example such as that schematized in FIG. 1, reactor (5), substantially parallelepipedic and vertical, has a plane of symmetry in which ventilator (V), whose axis is perpendicular in relation to said plane of symmetry, is located, the stratifying means (S) is substantially horizontal and stretches over the total width of reactor (5) between the walls (53) and (54) and the thermal means ($T_1$) and ($T_2$) are positioned in the free volume between the ventilator (V) and the end of the stratifying means located at the level of the plane of wall (54) of the reactor on either side of the plane defined by the stratifying means (S).

The reaction chamber (E) may comprise a sole means (V) for circulating the heat-carrying fluid or several circulating means (V), these means being most often ventilators; when only one ventilator is used, its diameter will be preferably substantially close to the value of the height, or the distance between the inlet (4) of the feedstock and the outlet (6) of the treated feedstock, of reactor (5), and, when several ventilators are used, their number will be preferably equal to n+1, each one of said ventilators being then preferably located on either side of a plane defined by one of said n+1 bedding means.

Figure 5:
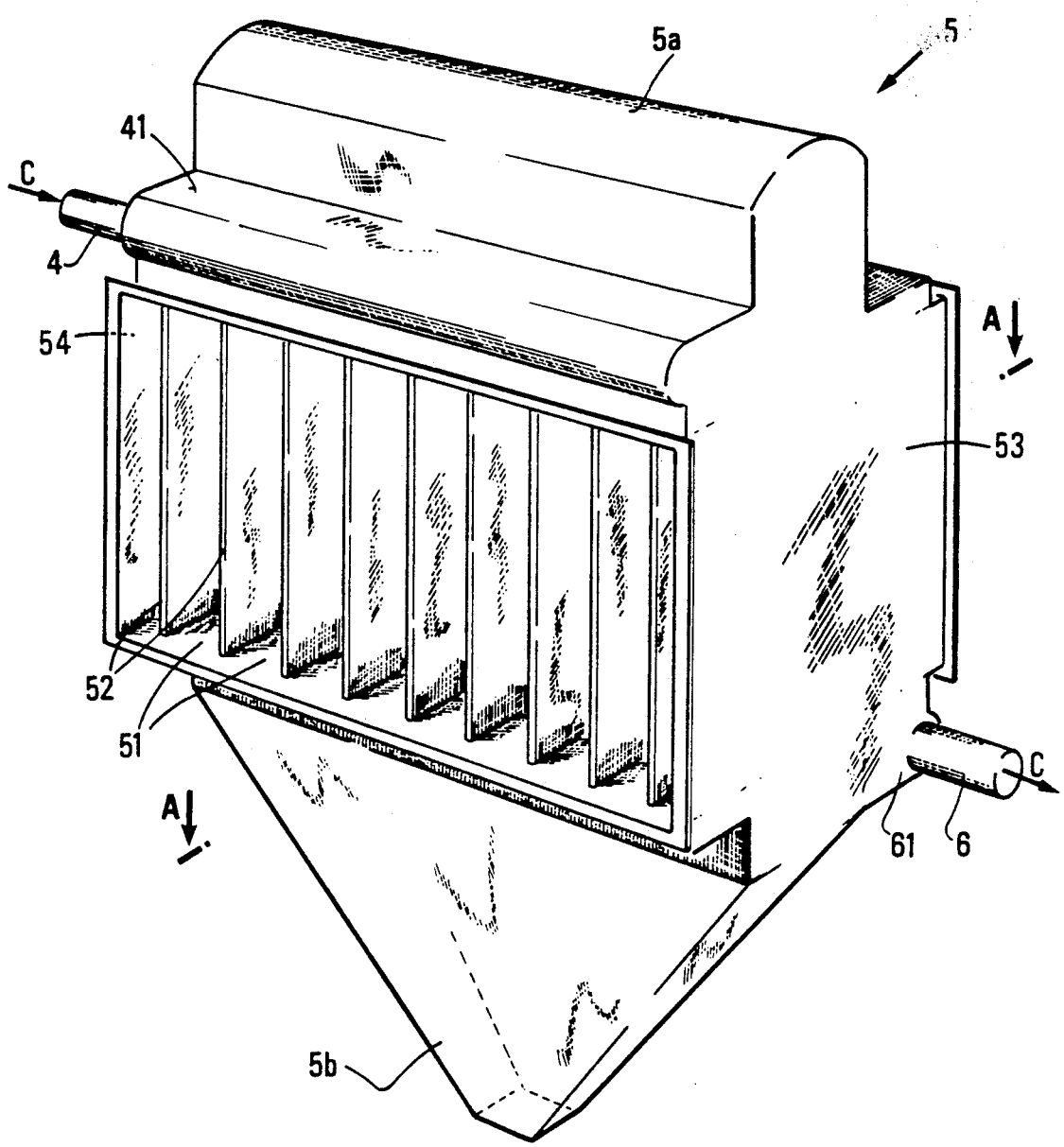
FIG. 5 illustrates a preferred type of reactor (5) contained in the reaction chamber (E) and notably usable in the reforming processes according to the invention, this type of reactor corresponding to that which is described by the applicant; assignee in its French patent application registered on July 22, 1988 under the national registration number EN. 88/10,039, a brief description of which will be included hereafter by way of reference.

In an embodiment form that is particularly well adapted to the case of overall endothermic reactions, for example in the case of catalytic reforming, the reaction chamber (E) of the present invention comprises a reactor (5) such as that schematized in FIG. 5. This reactor (5) (see FIGS. 5 to 11) comprises the main elements described above in relation with FIGS. 1 to 4 and also preferably comprises :

- at least one means (5a) for introducing the powdery solid, for example fresh catalyst, at the upper part of said reactor, next to the means (4) for introducing the feedstock,
- at least one means (5b) for carrying off the powdery solid (which will be called catalyst further on in the description) at the lower part of said reactor, next to the means (6) for carrying off the treated feedstock,
- at least two elementary reaction cells (52), substantially parallel in relation to one another, separated from one another, as well as from the walls (53, 54) of said reactor (5), through a substantially parallelepipedic channel (51), each one of said cells consisting of the three following compartments (see FIG. 6) :
- an individual feedstock distributor (52.1),
- an individual collector of the treated feedstock (52.3),
- a catalytic bed (for example moving) (52.2), inserted between said individual distributor and said individual collector.

Said bed (52.2) is open, on a total thin, substantially vertical face $F_1$, onto said individual distributor (52.1) and open, on all the other thin face $F'_1$ substantially parallel to $F_1$, onto said individual collector (52.3). These thin faces $F_1$ and $F'_1$ are each defined by a wall permeable to fluids and impermeable to solid catalytic particles (for example a grate of the Johnson type or based on profiled wires or any other equivalent means).

Each one of the two wide, substantially vertical faces of said bed (52.2) is closed by a fluid-tight wall whose extensions beyond said bed (52.2) constitute fluid-tight walls of the corresponding individual distributor (52.1) and individual collector (52.3).

The faces or walls of the elementary catalytic reaction cells (52) are for example made from flat sheet iron or any other equivalent means.

In case each bed (52.2) is a moving bed, the latter communicates, through its upper thin, substantially horizontal face $F_2$, with the means for introducing fresh catalyst (5a) and, through its lower thin, substantially horizontal face $F'_2$, with the means for carrying off the used catalyst (5b).

The reactor (5) according to the embodiment form particularly schematically illustrated in FIG. 5 also comprises :

- at least one general feedstock distributor (41), linked to the mean for introducing the feedstock (4) and to all the individual feedstock distributors (52.1) through one of their thin, substantially horizontal faces, and
- at least one general collector of the treated feedstock (61), linked to the means for carrying off the treated feedstock (6) and to all the individual collectors of the treated charge (52.3) through one of their thin, substantially horizontal faces which is substantially diagonally opposite, in relation to the center of the corresponding catalytic bed (52.2), the thin, substantially horizontal face of the corresponding individual distributor (52.1) through which the latter is linked to the general distributor (41).

Said reactor (5) also comprises:
- at least one fluid-tight wall linking together the substantially horizontal upper sides of the wide faces in relation to two neighboring catalytic beds (52.2),
- at least one fluid-tight wall linking together the substantially horizontal lower sides of said wide faces in relation to two neighboring catalytic beds (52.2),
at least one fluid-tight wall linking the substantially horizontal upper side of the wide face of the catalytic bed (52.2) which is closest to each wall (53 or 54) of the reactor (a wall substantially vertical and substantially parallel to said bed) to said wall, and
at least one fluid-tight wall linking the substantially horizontal lower side of the wide face of the catalytic bed (52.2) which is closest to each wall (53 or 54) of the reactor (a wall substantially vertical and substantially parallel to said bed) to said wall.

These four categories of fluid-tight walls are for example made from thin sheet iron, preferably thin corrugated iron, the developed surface of each one of them advantageously ranging between 1 and 500 times, preferably between 2 and 50 times the surface of the vertical walls (for example of the sheet iron) of the catalytic beds which they link together.

The individual distributors (52.1) and the individual collectors (52.3) advantageously have the same thickness $l_3$ and the same height $l_1$ as the catalytic beds (52.2).

The lattice reaction cells (52) are usually substantially parallelepipedic, substantially parallel between one another (and in relation to the walls (53) and (54) of said reactor). FIG. 6 shows a perspective of an elementary catalytic cell having the shape of a right-angled parallelepiped. This cell consists, according to the embodiment schematized in FIG. 6, of the following substantially parallelepipedic (right-angled in FIG. 6) three compartments:
- an individual feedstock distributor (52.1),
- an individual collector (52.3) of the treated feedstock,
- a powdery solid bed (52.2) (catalyst) inserted between said individual distributor and said individual collector.

This form of distributor and of collector of the reaction cell can also be seen in FIG. 8 which is a vertical section at the level of a reaction cell (52) of the reaction chamber (E) according to the invention comprising a reactor (5) such as that schematized in FIG. 5 and comprising two means ($S_1$) and ($S_2$) for stratifying the heat-carrying fluid.

FIG. 9 shows a vertical section of the same reaction chamber (E) at the level of a channel or hollow inner space (heat exchanger) (51).

According to a preferred embodiment allowing a better distribution of the feedstock in the catalyst bed, each one of the individual distributors (52.1) of the feedstock to be treated has a substantially prismatic shape whose section following a horizontal plane shows a larger surface close to the general feedstock distributor (41) than close to the general collector (61) of the treated charge; the individual collector (52.3) of the treated charge can have substantially the shape of a right-angled parallelepiped whose section, following a substantially horizontal plane, shows a substantially identical surface close to the general feedstock distributor (41) and close to the general collector (61) of the treated charge or preferably a substantially prismatic shape (as can be seen on the vertical section of the reaction chamber (E), at the level of a reaction cell (52), schematized in FIG. 11) whose section, following a substantially horizontal plane, shows a surface that is less large close to the general feedstock distributor (41) than close to the general feedstock collector (61). In this case, said powdery solid bed (52.2) inserted between said individual distributor and said individual collector has most often substantially the shape of a right-angled parallelepiped.

In the embodiment form of reactor (5) according to FIG. 5, each substantially parallelepipedic channel or hollow inner space (heat exchanger) (51) located between two cells (52) or located between a substantially vertical wall (53 or 54) of the reactor and the cell (52) that is closest to this wall and substantially parallel to said wall, is intended for the circulation of the heating gases. Each cell (52) is thereby sandwiched between two catalyst-free spaces. These spaces or channels (51) are open on all their "faces" substantially perpendicular to the substantially vertical lateral walls (53 and 54) of the reactor, in order to allow the inflow of a heat-carrying fluid (for example based on heating gas) into the reactor, and then its circulation between the cells (52) and finally its carrying off out of the reactor.

According to a preferred embodiment of the reaction chamber (E), reactor (5) is planned in such a way that the height $l_1$, the width $l_2$ and the thickness $l_3$ of each catalyst bed (52.2) answer the following conditions (1 mm = $10^{-3}$ m):

. $l_1 > l_2 > l_3$ with preferably $l_1 \geq 2\, l_2$;
. 50 mm $\leq l_2 \leq$ 10,000 mm, preferably 100 mm $\leq l_2 \leq$ 5 000 mm;
. 2 mm $\leq l_3 \leq$ 2 000 mm, preferably 5 mm $\leq l_3 \leq$ 500 mm.

Too low a width $l_2$ may produce a bad distribution of the reagents between the catalytic beds and is therefore not desirable; on the contrary, too high a width $l_2$ might tend to increase the average pressure within the catalyst, which is not desirable either.

In the case of the application to catalytic reforming, it may be preferable, in order to have a better conversion of the gasolines while the reaction chamber (E) according to the invention is being used, that the thickness $l_3$ of each catalytic bed (52.2) ($l_3$ also corresponding to the distance between the channels or hollow inner spaces (51) (heat exchangers) be such that:

$$\frac{l_3}{2} \geq dp_m \geq \frac{l_3}{200}, \text{ preferably } \frac{l_3}{5} \geq dp_m \geq \frac{l_3}{100},$$

where $dp_m$ corresponds to the average hydraulic diameter of a catalyst grain which represents the average size of a catalyst grain (dp hydraulic diameter of a catalyst grain = 6V/S, where V is its volume and S its surface).

When the catalyst grains are spheres, $dp_m$ represents the average diameter of said spheres.

It is possible to fit up (see FIG. 10) in each substantially parallelepipedic channel or hollow inner space (51) located between two neighboring elementary catalytic reaction cells (52) and in each substantially parallelepipedic channel or hollow inner space (51) located between a wall (53, 54) of the reactor and the elementary catalytic reaction cell (52) which is closest to this wall and substantially parallel to this wall, adjacent ducts, substantially parallel in relation to one another, and preferably substantially perpendicular to the overall direction of circulation of the feedstock to be treated (that is to say substantially horizontal in the case of a substantially vertical reaction chamber (E) comprising for example a substantially vertical reactor (5) such as that which is schematized in FIG. 5). These ducts can be made from corrugated iron, the sections of said ducts having, according to preference, one of the following shapes : triangular (FIG. 10B), square, rectangular, polygonal (FIG. 10A), of a portion of a sinusoid (FIG. 10C) or equivalent.

The object of the present invention is also the use of said reaction chamber (E) for carrying out the catalytic reforming of hydrocarbon cuts, particularly naphthas, for the manufacturing of gasolines with high octane numbers, under low pressure, as well as for performing the dehydrogenation of hydrocarbon paraffinic cuts in order to manufacture olefins, for example the conversion of propane into propylene and also for achieving the cyclization or dehydrocyclization of alkanes into aromatic compounds.

The reaction chamber (E) according to the present invention, and particularly that which comprises a reactor (5) such as that schematized in FIG. 5, having at least one means (5a) for introducing fresh catalyst continuously and at least one means (5b) for carrying off the used catalyst continuously, is particularly well adapted for performing the catalytic reforming of hydrocarbon cuts.

The present invention also relates to a catalytic reforming process performed in a reaction chamber (E) such as described above, in which a hydrocarbon feedstock is circulated under reforming conditions, in the presence of hydrogen, through a reaction zone (see FIGS. 1 to 11) in which the pressure ranges from 0.05 to 2.0 MPa, preferably from 0.05 to 1.0 MPa, said zone comprising :
- on one hand, at least two non adjacent elementary catalytic reaction spaces (52), preferably substantially parallelepipedic, each one preferably consisting of an individual distribution zone (52.1), preferably substantially parallelepipedic, of an individual collection zone (52.3), preferably substantially parallelepipedic, and of a catalyst bed (52.2) inserted between said two zones (52.1 and 52.3), preferably substantially parallelepipedic;
- on the other hand, hollow inner spaces (51), preferably substantially parallelepipedic.

Said elementary catalytic reaction spaces (52) and said hollow inner spaces (51) are preferably arranged substantially vertically or substantially parallel to one another, each elementary catalytic reaction space (52) being sandwiched between at least two hollow inner spaces (51) in which the heat-carrying fluid (heating gases defined above) which supplies the heat necessary to the reforming reaction flows preferably substantially horizontally.

In this improved process, the heat-carrying fluid is divided into n layers, the enthalpy of each layer being adjusted to the required value per heat input, said heat input being performed in or close to the stratifying zone before the inflow of the heat-carrying fluid into the hollow inner spaces (51), said layers of heat-carrying fluid bringing each the heat necessary to the reforming reaction, a process in which, besides :
the hydrocarbon feedstock is fed into a general distribution zone (41),
- said feedstock coming from the general distribution zone (41) is dispatched in the individual distribution zone (52.1) of each elementary catalytic reaction space (52),
- said feedstock is fed from each individual distribution zone (52.1) into each corresponding catalytic bed (52.2) which it flows through substantially horizontally, the feedstock and the heat-carrying fluid then circulating substantially parallel and following a cocurrent flow,
- the treated feedstock is recovered, at the outlet of each catalytic bed (52.2), in the corresponding individual collection zone (52.3),
- the treated feedstock is carried off out of each individual collection zone (52.3) into a general collection zone (61) through which said treated feedstock is withdrawn afterwards.

Moreover, in each lattice catalytic reaction space (52), the position of the inflow of the feedstock in the individual distribution zone (52.1) is substantially diagonally opposite, in relation to the center of the corresponding catalytic bed (52.2), the position of the outflow of the treated feedstock from the corresponding individual collection zone (52.3).

Each catalytic bed (52.2) is preferably of the moving type, the catalyst grains being for example continuously introduced at the upper part of each catalytic bed (52.2) and continuously withdrawn at the lower part of each catalytic bed (52.2) after circulating downwards inside each bed (52.2).

The catalyst grains can then be withdrawn at the lower end for example of a cupped zone having the shape of a cone or of a pyramid whose top is turned downwards, said zone being linked to the lower part of each catalytic bed (52.2).

It is advantageous that the heat-carrying fluid circulates, within each hollow inner space (51), in preferably substantially horizontal adjacent ducts (see FIGS. 10) based on corrugated iron, the sections of said ducts having, according to preference, one of the following shapes triangular (FIG. 10B), square, rectangular, polygonal (FIG. 10A), of a portion of a sinusoid (FIG. 10C) or equivalent. These ducts particularly allow one to provide a more homogenous circulation of the heat-carrying fluid in all the hollow inner spaces (51) and to constantly provide to said fluid a circulation very substantially parallel to that of the feedstock in the catalytic beds (52.2).

A preferred implementation of the processes according to the invention consists in that the height $l_1$, the width $l_2$ and the thickness $l_3$ of each catalytic bed (52.2) answer the following conditions (1 mm = $10^{-3}$ m) :
. $l_1 > l_2 > l_3$ with preferably $l_1 \geq 2l_2$;
. 50 mm $\leq l_2$ 10 000 mm, preferably 100 mm $\leq l_2$ 5 000 mm ;
. 2 mm $\leq l_3$ 2 000 mm, preferably 5 mm $\leq l_3 \leq$ 500 mm.

In order to increase the efficiency of the processes according to the invention, it may be preferable that the thickness $l_3$ of each catalytic bed (52.2) ($l_3$ also corresponds to the distance between the channels or hollow inner spaces (51) (heat exchangers)) be such that :

$$\frac{l_3}{2} \geq dp_m \geq \frac{l_3}{200} \text{, preferably } \frac{l_3}{5} \geq dp_m \geq \frac{l_3}{100}$$

where $dp_m$ corresponds to the average hydraulic diameter of a catalyst grain which represents the average size of a catalyst grain.

The invention also relates to a catalytic reforming process in which a hydrocarbon feedstock, usually liquid, is circulated under reforming conditions, in the presence of hydrogen, successively through two reaction zones, in at least the first one of which said process takes place as described above.

In the different processes according to the invention, the hourly weight flow of the hydrocarbon feedstock to be treated usually equals 1 to 10 times, preferably 2 to 5 times the total weight of catalyst present in the reaction zone(s).

In the cases where the heat-carrying fluid used consists of fumes (or heating gases), it is preferable to withdraw and thereby remove part of these heating gases (for example by means of a stack (100) shown in FIG. 1), the recycling rate of the heating gases (ratio by weight of recycled heating gases to withdrawn and not recycled heating gases) then usefully ranging between about 0.5 and about 200, preferably between about 2 and about 50.

In a preferred embodiment form of the reforming process according to the present invention, the heat carrying fluid is divided into 3 layers by 2 bedding means ($S_1$) and ($S_2$), each layer being heated in such a way that the outlet temperature of the heat-carrying fluid measured, at the level of each layer, in the plane substantially perpendicular to the substantially vertical lateral walls (53 or 54) of the reactor, in the outlet zone of the heat-carrying fluid substantially opposite a channel (51), be such that the lower layer located close to the general collector (61) of the treated feedstock has a temperature $Ts^3$, that the upper layer located close to the general the intermediate layer located between the two layers described before has a temperature $Ts_2$, said temperatures being such that $Ts^3$ is higher than or equal to $Ts^2$ which itself is higher than or equal to $Ts^1$ and that $Ts^3$ is higher than $Ts^1$.

The layers defined by the stratifying means (S) preferably have substantially equal volumes. With respect to the composition of the feedstocks, one of the hydrocarbon feedstocks to be reformed can usually contain 35 to 80 % by volume of paraffinic hydrocarbons, 14 to 51 % by volume of naphthenic hydrocarbons and 2 to 18 % by volume of aromatic hydrocarbons. It is generally mainly made of gasolines. This feedstock is for example a naphtha distilling between about 55° and about 225° C.

The reforming according to the invention is achieved on a mixture of said feedstock and of recycled hydrogen (or "recycle hydrogen"), in such a proportion that the molar ratio hydrogen to hydrocarbon feedstock to be treated ($H_2/HC$) usually ranges between about 1 and 100, preferably between about 2 and 10.

The reforming is carried out at a temperature usually ranging between about 300° and 700° C., preferably between about 400° and 600° C.

Any reforming catalyst known to one of ordinary skill in the art can be utilized, formed as particles, for example, substantially spherical.

Supported catalysts based on at least one noble metal from group VIII of the periodic table of elements will for example be used, generally platinum, preferably doped by at least one promoter such as indium, germanium, iridium (US-A-2,848,377), rhenium (US-A-3,415,737), tin (US-A3,700,588). A halogen such as chlorine or fluorine (FR-B-2,600,668) is generally mixed with the catalysts.

The supports of the reforming catalysts are usually selected from the oxides of metals from groups II, III and/or IV of the periodic table of elements, such as, for example, magnesium, aluminum, titanium, zirconium, thorium or silicon oxides, alone or mixed together or with oxides of other elements of the periodic table, such as for example boron. Coal may also be used. It is also possible to utilize zeolites or molecular sieves of the X or T type, or of the mordenite or fausajite type, or else of the ZSM-5, ZSM-4, ZSM-8 L, etc, type, as well as mixtures of oxides of metals from groups II, III and/or IV with zeolitic material.

A support mainly consisting of alumina is preferably used, that is to say in which alumina represents at least 50 % by weight in relation to the total weight of the support and preferably at least 80 % by weight, and more preferably, alumina is used alone.

The hydrocarbon feedstock to be reformed, preferably desulfurized, for example a mixture of gasolines from the direct distillation of crude oil and/or from the distillation of thermally or catalytically cracked oil products, is fed into the reforming unit where it mixes with hydrogen in a ratio generally ranging from about 1 to 100, preferably from about 2 to 10 moles of hydrogen per mole of feedstock of hydrocarbons to be treated.

The mixture formed thereby, which is then, according to the invention, at a pressure ranging between 0.05 and 2.0 MPa, preferably between 0.05 and 1.0 MPa, is then preferably indirectly preheated, usually up to a temperature ranging between about 300° and 700° C., advantageously between about 400° and 600° C.

Said mixture then flows, through duct (4), into the reactor (5) according to the invention and described hereafter, said reactor containing a reforming catalyst defined above.

In the reactor (5), the gasolines are reformed, their molecules being at least partly converted by means of dehydrogenation, isomerization, possibly dehydrocyclization and cracking reactions, into compounds with markedly improved antiknock properties.

These reactions result in a large production of hydrogen.

In the conventional units equipped with adiabatic reactors, the endothermicity of the reactions rapidly decreases the temperature and, in order to continue the reforming operations, it is then necessary to achieve at least one intermediate reheating, by sending the reagents on one or several exterior furnaces.

The processes of the invention are notably characterized in that the heat necessary for the reforming reactions is directly brought within the reactor, by means of a heat-carrying fluid, preferably based on fumes (or heating gases), coming for example from the air combustion of liquid or gaseous mixtures of hydrocarbons, such as natural gas, refinery gas, circulating between the catalyst beds contained in the reactor (5). The circuit of the heatcarrying fluid is not open onto the reaction system.

In order to avoid too great an accumulation of coke, the catalyst can be constantly renewed; to that effect, used catalyst is for example continuously withdrawn towards the bottom of reactor (5) and continuously replaced by fresh (and/or regenerated) catalyst introduced towards the top of reactor (5) (which is called moving bed operation).

According to an embodiment form of the reforming process according to the invention, the reaction system comprises a sole reactor (5), the reaction effluent coming out of said reactor through duct (6) to preheat the (hydrocarbons + hydrogen) mixture through a heat exchanger.

Sometimes advantageously, according to the refiner's needs, reactor (5) is followed by a second reactor (5'), either of the same type as reactor (5), or of the adiabatic type; the reaction effluent coming out of (5) enters (5') and, at the outlet of reactor (5'), the reaction effluent flows through a heat exchanger where it will preheat the (hydrocarbons + hydrogen) mixture.

It is advantageous to operate the second reactor (5') at an average temperature higher by 5° to 100° C., preferably by 10° to 50° C., than the temperature prevailing in the first reactor (5).

This second reactor (5') can be adiabatic. But it is advisable that it were made of an isothermal reactor of the same type as reactor (5), the heat necessary for the reforming reactions being directly brought within said reactor (5') also by means of a heat-carrying fluid, preferably based on fumes (or heating gases), coming for example from the air combustion of liquid or gaseous mixtures of hydrocarbons, circulating between the catalyst beds contained in reactor (5') (this heat-carrying fluid being identical or not to that circulating in reactor (5)).

This second reactor (5') can also work in moving beds; to that effect, used catalyst is for example continuously withdrawn towards the bottom of reactor (5') and continuously replaced by fresh (and/or regenerated) catalyst introduced towards the top of said reactor (5').

In the heat exchanger, the reaction effluent cools down and the gasolines, whose research octane number (RON) has been brought to about 100, are at least partly condensed.

This effluent is then brought for example into a final condenser where the gasolines finish condensing.

At the outlet of this condenser, the effluent flows for example into a separator which allows to separate the reformate from a hydrogen-rich gaseous mixture.

From the bottom of the separator, the obtained gasolines which constitute the reformate are withdrawn and preferably brought towards a stabilization zone.

The hydrogen-rich gaseous mixture flows out of the separator through a duct located towards its top. Hydrogen is recovered and recycled by means of a compressor in a feedstock mixing zone.

In reactor (5) (see figures), the heat necessary for the reforming reactions is, as we have seen above, supplied by a heat-carrying fluid, preferably based on fumes (or heating or fume gases).

To that effect, air is drawn in and preheated at a temperature usually ranging between 60° and 300° C., preferably between 100° and 250° C.

This preheated air then passes through a duct into a burner (T) (burning zone) contained in the reaction chamber (E), where it is used as a fuel for a mixture of hydrocarbons, for example natural gas brought in through a duct (these ducts are diagrammatically shown in the FIGS. by a sole line 80).

The amount of air used advantageously ranges between 1 and 5 times, preferably between 1 and 3.2 times the amount of stoichiometric air necessary to the combustion of the utilized mixture of hydrocarbons.

The temperature of the fume gases (or heating gases) is preferably set at a temperature most often ranging between 400° and 900° C., preferably between 450° and 750° C., an it is adjusted according to the level of the layer in relation to the level of the zone of inflow of the feedstock in the reactor.

In the case where a second reactor (5') of the same type as the first reactor (5) is used, the heat necessary for the reforming reactions in reactor (5') can also be supplied by a heat-carrying fluid preferably based on fumes (or fume gases or heating gases). The forming and the course of the heat-carrying fluid are for example analogous to those previously described in the case of reactor (5).

The following examples illustrate the invention without limiting the scope thereof.

EXAMPLE 1 (COMPARISON)

In a pilot catalytic reforming unit, whose reactor has been achieved according to FIGS. 5 to 9 and 10A, and whose catalytic beds are moving beds ($l_1$ = 2 500 mm, $l_2$ = 800 mm, $l_3$ = 90 mm and $l_3/dp_m$ = 15), but whose reaction chamber (E) has no bedding means but comprises three burners $T_1$, $T_2$ and $T_3$, the catalyst described hereafter is used and a feedstock (naphtha) mixed with hydrogen at a molar ratio of 4, whose composition is given below, is injected.

The utilized catalyst is based on platinum, chlorine and rhenium (by weight : 0.35 % Pt; 0.25 % Re; 1.12 % Cl) and is supported by alumina (with a specific surface of 200 m$^2$/g and a pore volume of 0.57 cm$^3$/g).

The hydrocarbon feedstock to be treated has the following composition :

| Paraffins | 55.3% |
|---|---|
| Naphthenes | 38.7% |
| Aromatics | 6.0% |

The feedstock enters the reactor (FIG. 5) at 450° C. and its temperature is set by means of a flow rate of fume gases whose inlet temperature is maintained at a value of 650° C. by mixing furnace fumes with outlet fumes of said reactor at 510° C.

The recycle ratio of the fumes (in a proportion by weight) is about 9 and the excess air that is used is about 10 %.

At the outlet, the obtained reformate is condensed, the hydrogen necessary for the mixture at the inlet is recycled and the purge of the manufactured gases is adjusted in order to obtain an outlet pressure of 0.23 MPa.

The hourly weight flow of the feedstock is set in order to obtain a 98 RON reformate.

At that time, it can be noticed that :
- the ratio between the injected hourly weight flow and the weight of the catalyst contained in the reactor is 3.3;
- the pressure at the reactor inlet is 0.25 MPa;
- the temperature of the reagents, although equal to 495° C. at the outlet, reaches a 420° C. minimum within the reactor;
- the yields become established as follows (% by weight in relation to the feedstock) :

| $H_2$ | 3.6% |
|---|---|
| $C_{1-2}$ | 2.2% |
| $C_{3-4}$ | 4.6% |
| Reformate ($C_{5+}$) | 89.6% |

Despite a low inlet temperature (450° C.), thanks to the low pressure running allowed by this isotherm reaction system, a good reformate and hydrogen yield can be obtained.

EXAMPLE 2 (ACCORDING TO THE INVENTION)

Example 1 above is repeated, but a reaction chamber comprising two means $S_1$ and $S_2$ for bedding the heating gas is used, whose planes are respectively located between burners $T_1$ and $T_2$ and between burners $T_2$ and $T_3$ (see FIGS. 8 and 9).

The feedstock also enters the reactor (5) at 450° C. and its temperature is set by means of the same flow rate of fumes whose inlet temperature is maintained at the value of 650° C.

The burners are set in such a way that the outlet temperatures of the fume gases from reactor (5) at the level of each created layer, $Ts^3$, $Ts^2$, $Ts^1$, are respectively equal to 515°, 510° and 505° C.

The recycle rate of the fumes is about 9 and the utilized excess air is about 10 %.

At the outlet, the obtained reformate is condensed, the hydrogen necessary for the mixture at the inlet is recycled and the purge of the manufactured gases is set in order to obtain an outlet pressure of 0.23 MPa.

The hourly weight flow of feedstock is set in order to obtain a 98 RON reformate.

At that time, it can be noticed that :
- the ratio between the injected hourly weight flow and the weight of the catalyst contained in the reactor is 3.3;
- the pressure at the reactor inlet is 0.25 MPa;
- the temperatures of the reagents at the outlet of the catalyst bed at the level of the center of the first layer, of the center of the second layer and of the center of the third layer are respectively equal to 490°, 495° and 500° C;
- the yields become established as follows (% by weight in relation to the feedstock) :

| | |
|---|---|
| $H_2$ | 3.8% |
| $C_{1-2}$ | 2.0% |
| $C_{3-4}$ | 4.2% |
| Reformate ($C_{5-}$) | 90.0% |

A better reformate and hydrogen yield is thus obtained.

We claim:

1. A reaction chamber comprising:
an extended reactor comprising reactor walls, at a first end at least one means for introducing a feedstock to be treated, and at a second end at least one means for carrying off the treated charge; at least two elementary reaction cells out of touching contact with one another and out of touching contact with the walls of said reactor, each reactor cell linked from an end thereof to said means for introducing said feedstock, and from an opposite end thereof to said means for carrying off said treated feedstock, said elementary reaction cells containing in at least a part of their volume at least one powdery solid, said reaction cells being separated from one another and from the walls of said reactor, by a channel stretching over a length at least equal to that over which said powdery solid contained in said elementary reaction cells stretches,
at least one means for circulating in each channel of said reactor, in a substantially transverse way in relation to the overall direction of circulation of the feedstock to be treated in said reactor, at least one heat-carrying fluid contained in said reaction chamber,
at least n means for stratifying the flow of heat-carrying fluid, said means being positioned substantially perpendicularly to the overall direction of circulation of the feedstock to be treated in said reactor, and positioned upstream in relation to the direction of circulation of said heat-carrying fluid, from the face of the channels through which said heat-carrying fluid enters said channels, n being an integer greater than or equal to 1,
at least $n+1$ thermal means for modifying the enthalpy of part of said heat-carrying fluid, each one of said thermal means being positioned on either side of a plane defined by one of said stratifying means, and upstream, in relation to the direction of circulation of said heat-carrying fluid, from the face of the channels through which said heat-carrying fluid enters said channels.

2. A chamber according to claim 1 wherein said means for circulating the heat-carrying fluid is a ventilator, said fluid being a gas and said chamber comprising 2 means for stratifying the flow of heat-carrying fluid and 3 thermal means each one modifying the enthalpy of part of the heat-carrying fluid.

3. A chamber according to claim 1 wherein the thermal means modifying each one the enthalpy of part of the heat-carrying fluid are heating means.

4. A chamber according to claim 3 wherein the heating means are burners supplied with gaseous, liquid or solid fuel.

5. A chamber according to claim 1 wherein said reactor has the overall shape of a right-angled parallelepiped, said means for circulating said heat-carrying fluid is located in the extension of said reactor substantially in the volume contained between the planes going through 4 of the faces of said right-angled parallelepiped and said stratifying means, and said thermal means for modifying the enthalpy of part of said heat-carrying fluid are located in a volume contained between said circulating means and the face of said right-angled parallelepiped through which said heat-carrying fluid enters.

6. A chamber according to claim 1, wherein said reactor also comprises:
at least one means for introducing a powdery solid at the upper part of said reactor close to the means for introducing the feedstock to be treated,
at lest one means for carrying off the powdering solid at the lower part of said reactor close to the means for carrying off the feedstock;
at least two elementary reaction cells substantially vertical, parallelepipedic and substantially parallel in relation to one another, separated from one another and from the wall of the reactor, by a substantially parallelepipedic channel, each of said cells comprising two vertical faces $F_1$ and $F'_1$ and two vertical faces $F_2$ and $F'_2$, and the following three compartments:
an individual feedstock distributor,
an individual collector of the treated feedstock, and
a powdery solid bed inserted between said individual distributor and said individual collector, said bed being open, on a substantially vertical face $F_1$, onto said individual distributor and open, on the face $F'_1$ substantially parallel to $F_1$, onto said individual collector, said faces $F_1$ and $F'_1$ being each defined by a wall permeable to fluids and impermeable to solid particles, said bed communicating, through its upper substantially horizontal face $F_2$, with said means for introducing the solid and, through its lower substantially horizontal face $F'_2$, substantially parallel to $F_2$, with said means for carrying off the solid, said bed being such that each one of its two substantially vertical faces is closed by a fluid-tight wall whose extensions beyond said bed form fluid-tight walls of said individual distributor and of said individual collector, at least one fluid-tight wall linking together the substantially horizontal upper sides of the faces in relation to two neighboring solid beds, at least one fluid-tight wall linking together the substantially horizontal lower sides of said faces in relation to two neighboring solid beds, at lest one fluid-tight wall linking the substantially horizontal upper side of the face of the solid bed closest to each wall of said reactor and substantially parallel thereto, to said wall, at least one fluid-tight wall linking the substantially horizontal lower side of the wide face of the solid bed closest to each wall of said reactor and substantially parallel to said bed, to said wall, at least one general feedstock distributor, linked to said means for introducing the feedstock and to all the individual feedstock distributors by one of their substantially horizontal faces, at least one general collector of the treated feedstock, linked to said means for carrying off the treated feedstock and to all the individual collectors of the treated feedstock by one of their substantially horizontal faces which is substantially diagonally opposite, in relation to the center of the corresponding solid bed, the substantially horizontal face of the corresponding individual distributor through which the latter is linked to the general distributor.

7. A chamber according to claim 6 wherein said reactor comprises at least two elementary reactor cells, each one of said cells comprising the following substantially parallelepipedic three compartments :
an individual feedstock distributor,
an individual collector of the treated feedstock,
- a powdery solid bed inserted between said individual distributor and said individual collector.

8. A chamber according to claim 6 wherein said reactor comprises at least two elementary reaction cells, each one of said cells comprising of the following three compartments :
- an individual feedstock distributor, of a substantially prismatic shape, whose section following a substantially horizontal plane has a greater surface close to the general feedstock distributor than close to the general collector of the treated feedstock,
- an individual feedstock collector, having substantially either the shape of a right-angled parallelepiped whose section, following a substantially horizontal plane, has an equal surface close to the general feedstock distributor and close to the general feedstock collector, or a substantially prismatic shape whose section, following a substantially horizontal plane, has a surface that is less large close to the general feedstock distributor than close to the general feedstock collector,
- a powdery solid bed inserted between said individual distributor and said individual collector.

9. A chamber according to claim 1 wherein, in each channel of said reactor located between two neighboring elementary reaction cells or between a reactor wall and the lattice cell that is closest to this wall, adjacent ducts substantially parallel to one another are arranged, said ducts having a section of a triangular, square, rectangular, polygonal shape or of the shape of a portion of a sinusoid.

10. A chamber according to claim 2, wherein the thermal means for modifying the enthalpy of part of the heat-carrying fluid are heating means.

11. A chamber according to claim 2, wherein said reactor has the overall shape of a right-angled parallelepiped, said means for circulating said heat-carrying fluid is located in the extension of said reactor substantially in the volume contained between the planes going through four of the faces of said right-angled parallelepiped and said stratifying means, and said thermal means for modifying the enthalpy of part of said heat-carrying fluid are located in a volume contained between said circulating means and the face of said right-angled parallelepiped through which said heat-carrying fluid enters.

12. A chamber according to claim 2, wherein said reactor comprises at least two elementary reaction cells, each one of said cells comprising the following substantially parallelepipedic three compartments:
an individual feedstock distributor;
an individual collector of the treated feedstock,
a powdery solid bed inserted between said individual distributor and said individual collector.

13. A chamber according to claim 2, wherein said reactor comprises at least two elementary reaction cells, each one of said cells comprising the following three compartments:
an individual feedstock distributor, of a substantially prismatic shape, whose section following a substantially horizontal plane has a greater surface close to the general feedstock distributor than close to the general collector of the treated feedstock,
an individual feedstock collector, having substantially either the shape of a right-angled parallelepiped whose section, following a substantially horizontal plane, has an equal surface close to the general feedstock distributor and close to the general feedstock collector, or a substantially prismatic shape whose section, following a substantially horizontal plane, has a surface that is less large close to the general feedstock distributor than close to the general feedstock collector,
a powdery solid bed inserted between said individual distributor and said individual collector.

14. A chamber according to claim 11, wherein said reactor comprises at least two elementary reaction cells, each one of said cells comprising the following three compartments:
an individual feedstock distributor, of a substantially prismatic shape, whose section following a substantially horizontal plane has a greater surface close to the general feedstock distributor than close to the general collector of the treated feedstock;
an individual feedstock collector, having substantially either the shape of a right-angled parallelepiped whose section, following a substantially horizontal plane, has an equal surface close to the general feedstock distributor and close to the general feedstock collector, or a substantially prismatic shape whose section, following a substantially horizontal plane, has a surface that is less large close to the general feedstock distributor than close to the general feedstock collector, a powdery solid bed inserted between said individual distributor and said individual collector.

15. In a reaction chamber comprising an extended reactor comprising reactor walls, at a first end at least one means for introducing a feedstock to be treated, and at a second end at least one means for carrying off the treated charge; at least two elementary reaction cells out of touching contact with one another and out of touching contact with the walls of said reactor, each reactor cell linked from an end thereof to said means for introducing said feedstock, and from an opposite end thereof to said means for carrying off said treated feedstock, said elementary reaction cells containing in at least a part of their volume at least one powdery solid, said reaction cells being separated from one another and from the walls of said reactor, by a channel stretching over a length at least equal to that over which said powdery solid contained in said elementary reaction cells stretches, the improvement which comprises:

- at least n means for stratifying the flow of heat-carrying fluid, said means being positioned substantially perpendicularly to the overall direction of circulation of the feedstock to be treated in said reactor, and positioned upstream in relation to the direction of circulation of said heat-carrying fluid, from the face of the channels through which said heat-carrying fluid enters said channels, n being an integer greater than or equal to 1,
- at least n+1 thermal means for modifying the enthalpy of part of said heat-carrying fluid, each one of said thermal means being positioned on either side of a plane defined by one of said stratifying means, and upstream, in relation to the direction of circulation of said heat-carrying fluid, from the face of the channels through which said heat-carrying fluid enters said channels.

* * * * *